(No Model.)
J. A. PEER.
CHUCK.
No. 282,765. Patented Aug. 7, 1883.
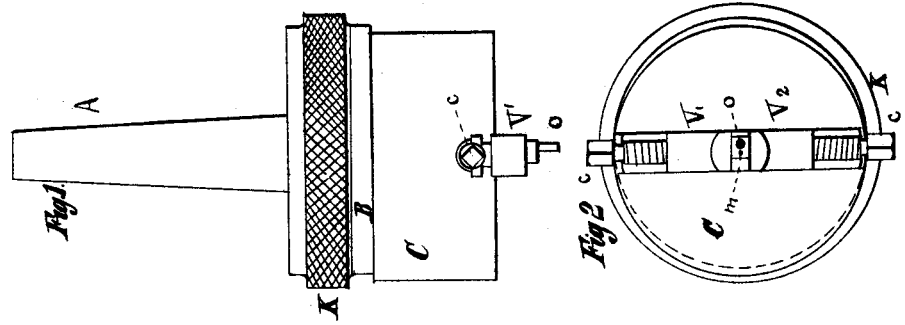
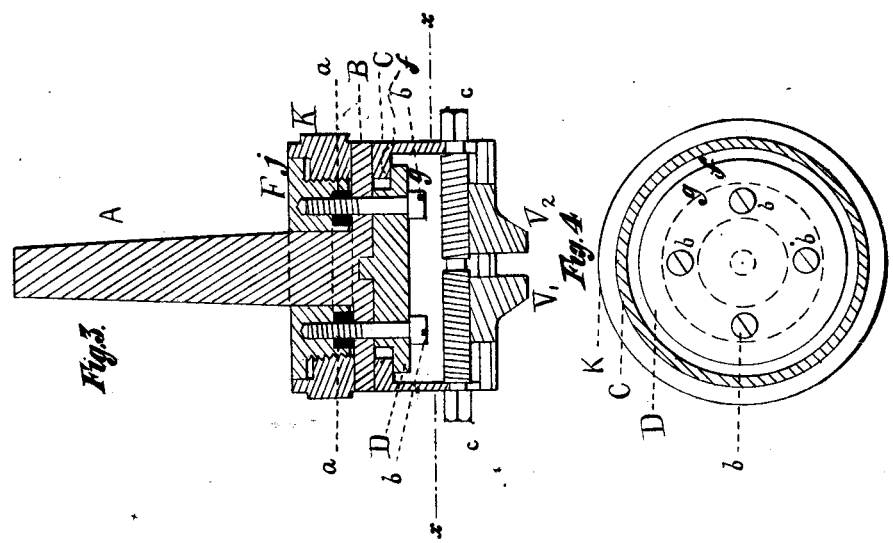
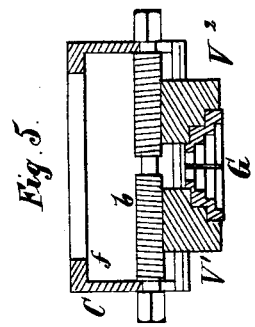
WITNESSES:
T. J. Keane
James R. Bowen
INVENTOR
John A. Peer
BY Edwin H. Brown
ATTORNEY

UNITED STATES PATENT OFFICE.

JOHN A. PEER, OF GRASS VALLEY, CALIFORNIA, ASSIGNOR TO THE AUTOMATIC CENTERING CHUCK COMPANY, OF NEW JERSEY.

CHUCK.

SPECIFICATION forming part of Letters Patent No. 282,765, dated August 7, 1883.

Application filed May 19, 1882. (No model.)

*To all whom it may concern:*

Be it known that I, JOHN A. PEER, of Grass Valley, in the county of Nevada and State of California, have invented a certain new and useful Improvement in Chucks, of which the following is a specification.

The improvement consists in the combination, in a chuck, of the shank whereby it may be secured in a lathe, and the body-piece provided with jaws for holding an article to be operated upon in the lathe, the shank being provided with the circular plate or cylinder, and part of the body-piece being made to surround said plate or cylinder, and being made in all directions larger than the plate or cylinder, so that the body-piece may be adjusted eccentrically to the shank in any direction to center an article held by the jaws.

The improvement also consists in the combination, in a chuck, with the shank serving as the means whereby it may be secured in a lathe, and provided with the circular plate or cylinder, and the body-piece provided with jaws for holding an article to be operated upon in the lathe, and loosely surrounding said plate or cylinder, so that it may be adjusted eccentrically to the shank in any direction, of the ring of india-rubber or like material for temporarily retaining the body-piece in any position to which it may be adjusted, and means for securing the body-piece in position after adjustment.

The improvement also consists in other combinations of parts, hereinafter described and claimed.

In the accompanying drawings, Figure 1 is a side view of a chuck embodying my improvement. Fig. 2 is an end view thereof. Fig. 3 is a central longitudinal section of the same. Fig. 4 is a transverse section of the same, taken on the plane of the dotted line $x$ $x$, Fig. 3; and Fig. 5 is a transverse section of the jaws and an appurtenance thereof.

Similar letters of reference designate corresponding parts in all the figures.

A designates the shank of the chuck, by which it is secured in place in a lathe.

D designates a body-piece, of cylindric form, which carries the jaws $V'$ $V^2$, whereby articles to be operated upon are held.

Secured to or formed with the shank A is a disk or plate, B, against which bears an inwardly-turned flange, $f$, on the rear of the body-piece C.

D designates a plate or cylinder which is considerably smaller in diameter than the interior of the flange $f$ of the body-piece C, and extends within the same. The plate or cylinder D is always concentric with the shank A, and to that extent may be considered as a part thereof or a fixture thereon. This plate D has a flange, $g$, which laps over and bears against the flange $f$ of the body-piece C. The plate D bears against the disk or plate B, and, as here shown, is provided with a stud, $h$, which fits in a recess in the said disk or plate B, so as to preserve the proper relative positions of the said parts. At the rear of the disk or plate B is a ring, F, which is secured to the plate D by means of screws $b$, which pass loosely through the plate D and the disk or plate B and screw into the ring F. These screws do not clamp the plate or disk B, the plate D, and ring F tightly together, but are adjusted so as to leave a small amount of play between them. Between the ring F and the plate or disk B is a ring, $a$, of india-rubber or like material. As the plate or disk B and plate D can move slightly lengthwise of the screws $b$, this ring of rubber, by its resilience, causes the flange $g$ of the plate D to press on the flange $f$ of the body-piece C, and yet with insufficient force to prevent the adjustment of the body-piece laterally in any direction relatively to the plate or disk B, when it is desired to center an article held by the jaws. As shown, this ring $a$ fits in a recess in the ring F, and the screws $b$ pass through it. The exterior of the ring F is screw-threaded, and at the rear it is provided with a flange, $j$.

K designates an internally-screw-threaded clamping-piece of annular form fitting around the ring F. The flange $j$ of the ring F overlaps this clamping-piece and forms a stop, whereby its movement is limited. By turning the clamping-piece in one direction it may be run along the screw-thread of the ring F, so as to have no action on the body-piece C; but by turning it in the other direction it will be caused to force the ring F rearward on the shank A, and consequently to clamp the flange $f$ of the body-piece C between the flange $g$ of the plate D and the disk or plate B. Preferably the screw-thread of the ring F will be a left-hand thread, so that the rotation of the chuck in the ordinary direction in use will not tend to effect the loosening of the clamping-piece K.

The jaws V' V² are operated in the ordinary manner by screws c, which may be made integral, and have one a right and the other a left hand thread. The jaws may be provided with a number of steps, as shown in Fig. 5, and they may be reversed, as there shown. If desirable, they may have a split ring, G, inserted between them, and by turning the screws such ring may be clamped on an article which is to be held by it—such, for instance, as a gear-wheel.

When an article—such, for instance, as a watch-arbor, O—is placed in the chuck, the clamping-piece is manipulated to release the body-piece C. This then shifts laterally to allow of the arbor being properly centered. The lathe is then stopped and the clamping-piece is manipulated to secure the body-piece in the position to which it was shifted. The ring a, of india-rubber or like material, exerts sufficient force to retain the body-piece in position until it is secured by the clamping-piece.

It will be seen that any article will be very easily centered in this chuck and without adjusting the jaws. It may at any time be centered differently to enable different portions to be operated upon.

What I claim as my invention, and desire to secure by Letters Patent, is—

1. In a chuck, the combination of the shank whereby it may be secured in a lathe, and the body-piece provided with jaws for holding an article to be operated upon in the lathe, the shank being provided with the circular plate or cylinder, and part of the body-piece being made to surround said plate or cylinder, and being made in all directions larger than the plate or cylinder, so that the body-piece may be adjusted eccentrically to the shank in any direction to center an article held by the jaws, substantially as herein specified.

2. In a chuck, the combination, with the shank serving as the means whereby it may be secured in a lathe, and provided with a circular plate or cylinder, and the body-piece provided with jaws for holding an article to be operated upon in the lathe, and loosely surrounding said plate or cylinder, so that it may be adjusted eccentrically to the shank in any direction, of the ring of india-rubber or like material for temporarily retaining the body-piece in any position to which it may be adjusted, and means for securing the body-piece in position after adjustment, substantially as herein specified.

3. The combination of the shank A, the disk or plate B, the body-piece C, the plate D, the ring F, connected to the plate D, and the clamping-piece K, substantially as specified.

4. The combination of the shank A, the disk or plate B, the body-piece C, having a flange, f, the plate D, having a flange, g, the ring F, the screws b, and the clamping-piece K, substantially as specified.

5. The combination of the shank A, the disk or plate B, the body-piece C, the plate D, the ring F, connected to the plate D, and the ring a, of india-rubber or like material, substantially as specified.

6. The combination of the shank A, the disk or plate B, the body-piece C, the plate D, the ring F, connected to the plate D, the ring a, of india-rubber or like material, and the clamping-piece K, substantially as specified.

JOHN A. PEER.

Witnesses:
T. J. KEANE,
JAMES R. BOWEN.

It is hereby certified that in Letters Patent No. 282,765, granted August 7, 1883, upon the application of John A. Peer, of Grass Valley, California, for an improvement in "Chucks," the reference letter "D," in line 48, page 1, of the printed specification, was erroneously substituted for the reference letter "C;" and that the reference letter "C" should be read in the said specification to make the same conform with the record of the case in the Patent Office.

Signed, countersigned, and sealed this 14th day of August, A. D. 1883.

[SEAL.]

M. L. JOSLYN,
*Acting Secretary of the Interior.*

Countersigned:

E. M. MARBLE,
*Commissioner of Patents.*